United States Patent [19]

Akiyama et al.

[11] 4,211,967
[45] Jul. 8, 1980

[54] MOTOR SPEED ADJUSTING APPARATUS

[75] Inventors: Ryo Akiyama, Sakai; Yoshiaki Igarashi, Ikoma, both of Japan

[73] Assignee: Matsushita Electric Industrial Co., Ltd., Kadoma, Japan

[21] Appl. No.: 898,852

[22] Filed: Apr. 21, 1978

[30] Foreign Application Priority Data

Apr. 27, 1977 [JP] Japan .................................. 52/49562
May 4, 1977 [JP] Japan .................................. 52/51413

[51] Int. Cl.² ............................................. H02P 7/28
[52] U.S. Cl. ................................. 318/490; 318/314; 318/318
[58] Field of Search ................. 318/314, 318, 490; 324/161, 166, 164, 167, 172, 175, 83 D, 83 FE; 328/110, 155; 179/100 DS; 358/128; 360/73; 340/658; 274/9; 73/507

[56] References Cited

U.S. PATENT DOCUMENTS

| | | | |
|---|---|---|---|
| 3,268,788 | 8/1966 | Branco | 318/314 |
| 3,458,823 | 7/1969 | Nordahl | 328/110 |
| 3,724,720 | 4/1973 | Bullivant | 318/318 |
| 3,974,428 | 8/1976 | Hafle | 318/314 |
| 3,982,190 | 9/1976 | Schaefer | 324/83 D |
| 4,031,466 | 6/1977 | Krause et al. | 324/83 FE |
| 4,074,196 | 2/1978 | Webster | 324/166 |

OTHER PUBLICATIONS

Connelly et al., "Phase-Lodged Loop Includes Lock Indicator", *Electronics,* 9/5/74, pp. 112-113.
Smithgall, D. H., "A Phase-Locked Loop Motor Control System", IEEE Transactions on Industrial Electronics, vol. IECI-22, No. 4, 11-75.

*Primary Examiner*—David Smith, Jr.
*Attorney, Agent, or Firm*—Wenderoth, Lind & Ponack

[57] ABSTRACT

A motor speed adjusting apparatus comprising a motor, a motor speed setting device such as an up-down counter, a programmable divider the divisor of which is programmed by the motor speed setting device, a reference signal generator, a phase comparator which generates a d.c. voltage corresponding to the phase difference between the reference frequency signal and the output signal of the programmable divider, and a voltage controlled oscillator which oscillates at a frequency corresponding to the output of the phase comparator. The motor speed is adjusted according to the output frequency of the oscillator by step deviation from the standard motor speed, and further that deviation is displayed by a display device controlled by the motor speed setting device.

9 Claims, 3 Drawing Figures

MOTOR SPEED ADJUSTING APPARATUS

This invention relates to a motor speed adjusting apparatus, and more particularly to an apparatus which can adjust the motor speed by a deviation percentage step from a standard motor speed while displaying the adjusted deviation percentage in digital numerals.

In the prior art, there are two types of speed controlled motors for adjusting the rotation speed of a motor used for example in a record player. One of these uses a tachometer generator and a voltage comparator circuit for regulating the motor speed. To adjust the speed of such a motor, a reference voltage applied to the voltage comparator is changed according to the pattern movement of a strobe scope. The other type control employs a phase controlled motor which has a phase lock loop for synchronization with a reference frequency signal, and the oscillating frequency of an oscillator such as an astable multivibrator or a RC oscillator is changed adjust the speed of this motor, in a manner similar to monitoring the pattern movement of the strobe scope in the first system.

According to these conventional methods, because of the influence of changes in the ambient temperature on the long term characteristic variation of the electronic component used, it is difficult to maintain the motor speed constant. Further, it is also difficult to display a speed correctly corresponding to the actual motor speed for adjusting the motor speed continuously.

In order to improve the stability of the motor speed control, a crystal resonator is available to provide a stable reference signal oscillator. That is, the reference signal is obtained by dividing the frequency signal of the crystal oscillator by means of a programmable divider, and the motor speed is synchronized to that reference signal. The motor speed can be adjusted by changing the divisor of the programmable divider.

in this case, however, because the divisor of the programmable divider is inversely proportional to the frequency obtained by the divider, the setting of the divisor does not correspond linearly to the motor speed or to the motor speed deviation from a rated speed. This is undesirable for the operator of the motor.

Therefore, it is an object of the present invention to provide a novel and improved motor speed adjusting apparatus which is free from the above mentioned defects.

It is another object of the present invention to provide a motor speed adjusting apparatus which can adjust exactly the motor speed in percentages steps and which can display the adjusted percentage value in digital numerals with a simple construction and easy operation.

It is a further object of the present invention to provide a motor speed adjusting apparatus which is operated by an up-down counter and which is easily resetable to a standard motor speed, i.e. 0% deviation.

These objects are achieved by providing a motor speed adjusting apparatus according to the present invention, which comprises: a frequency controlled motor the rotating speed of which is to be adjusted; a motor speed setting means; a programmable divider coupled to the motor speed setting means, the divisor of the programmable divider being programmed by the motor speed setting means; a display means for displaying information of the speed of the motor according to an output signal from the motor speed setting means; a reference frequency signal generating means for generating a reference frequency signal; a phase comparator having two input terminals, the reference frequency signal from the reference signal generating means being applied to one and the output signal from the programmable divider being applied to the other, the phase comparator thereby generating a d.c. voltage corresponding to the phase difference between the reference frequency signal and the output signal of the programmable divider; and a voltage controlled oscillator connected to the phase comparator and oscillating at a frequency according to the output voltage of the phase comparator, the output signal of the voltage controlled oscillator being applied to the programmable divider, and the speed of the frequency controlled motor being controlled according to the frequency of the output signal of the voltage controlled oscillator, wherein the divisor of the programmable divider is stepwise changeable from a standard number N (N being an integer) which corresponds to a nominal motor speed, and the rate of deviation from the standard number N being displayed on the display means.

These and other objects and features of the present inventions will become apparent from consideration of the following detailed description of the invention taken together with the accompanying drawings in which.

Figure 1:
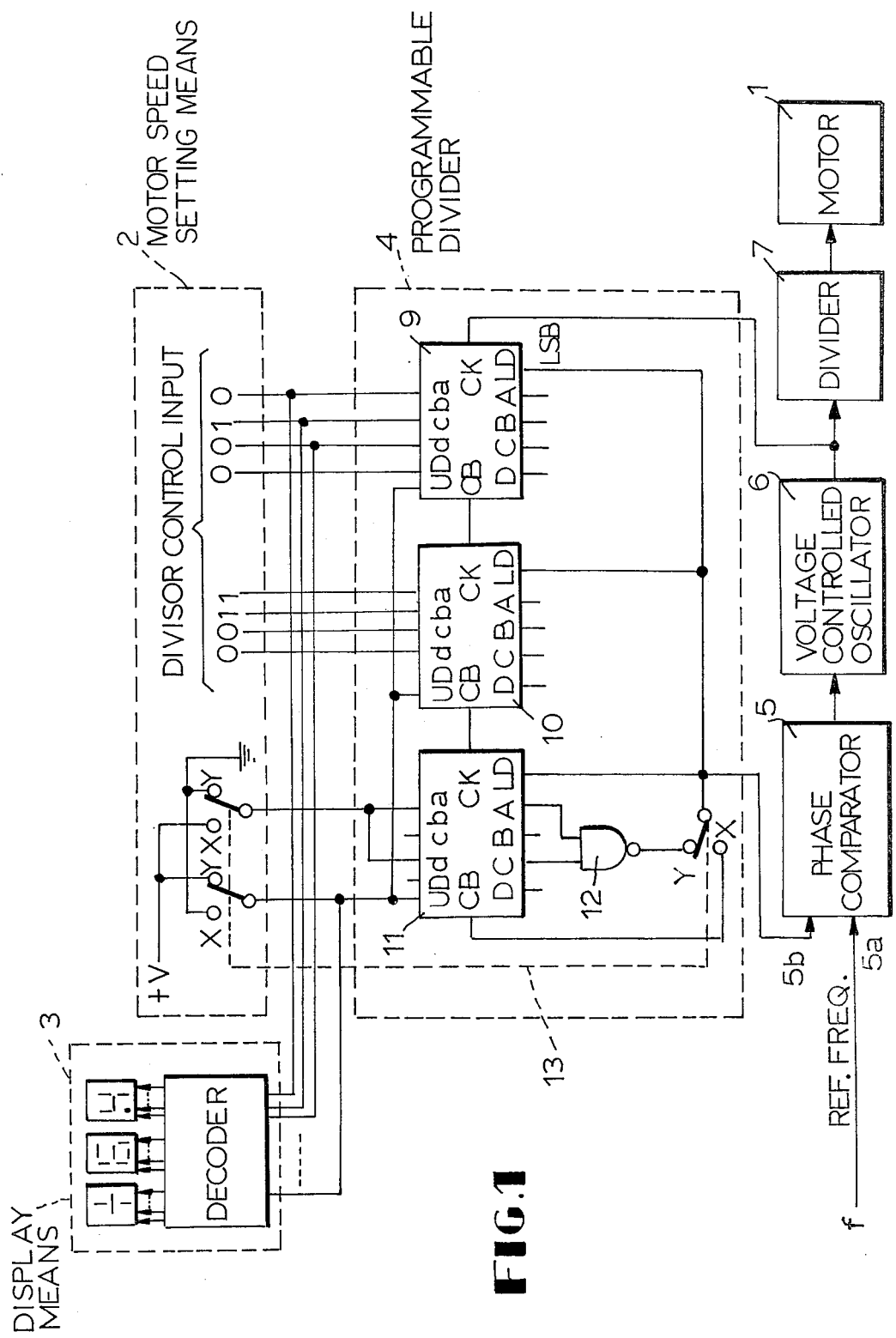
FIG. 1 is a circuit block diagram of an embodiment of the invention.

Now, referring to FIG. 1, the construction of the motor speed adjusting apparatus of the invention will be explained. Reference numeral 2 designates a motor speed setting means for setting the speed of a motor 1. A display means 3 displays the speed setting in % (percent) deviation from a standard speed, according to the output of the motor speed setting means 2. A programmable divider 4 is coupled to the speed setting means 2, and its divisor is programmed by the speed setting means 2.

A phase comparator 5 has two input terminals 5a and 5b, and it generates a d.c. voltage corresponding to the phase difference between two signals applied to these input terminals 5a and 5b. A voltage controlled oscillator 6 is connected to the phase comparator, and its oscillating frequency is controlled by the output of the phase comparator 5. The output of the voltage controlled oscillator 6 is also applied to the input terminal 5b of the phase comparator 5 through the programmable divider 4. A reference frequency signal f from a reference signal generating means (not shown) is applied to the other input terminal 5a of the phase comparator 5. The voltage controlled oscillator 6, the programmable divider 4 and the phase comparator 5 form a phase lock loop (PLL) which operates to multiply the reference frequency signal f. The output of the voltage controlled oscillator 6 is applied to the motor 1. If necessary, a frequency divider 7 is connected between the voltage controlled oscillator and the motor 1.

FIG. 1 shows an example of the speed adjusting apparatus adjusting the motor speed by a 0.2 % step. A more detailed description of the programmable divider 4 and the speed setting means 2 is provided in the following. The programmable divider 4 contains programmable up-down counters 9, 10 and 11 of the same construction connected in cascade and a NAND gate 12. Each of the programmable up-down counters 9, 10 and 11 has four preset input terminals a, b, c and d, a clock input terminal CK, a carryborrow terminal CB, a load terminal LD which controls the loading of preset value at the preset input terminals a, b, c and d into the programmable up-down counter, and an UD terminal which selects an up or down count operation of the counter.

The up-down counter 11 has BCD (Binary Coded Decimal) output terminals A, B, C and D. Outputs A and C of the up-down counter 11 are connected to the input terminals of the NAND gate 12. A combination switch 13 having three sections controls the operation of the programmable divider 4. The above mentioned input terminals a, b, c and d and the output terminals A, B, C and D of the programmable up-down counters 9, 10 and 11 correspond in turn to the numerals $2^0, 2^1, 2^2$ and $2^3$, respectively. The programmable up-down counters 9, 10 and 11 operate as an up counter when the signal at the UD terminal is a logic 1 level (true logic) and operate as a down counter when the signal at the UD terminal is a logic O level (false logic).

Now, the operation of the circuit shown in FIG. 1 will be explained. In the illustrated case, the motor speed is adjusted to −6.4 percent deviation from the standard motor speed. When the divisor control input composed of respective preset input terminals a, b, c and d of the programmable up-down counters 10 and 9 is preset to 32 (0011, 0010) and the switch 13 is connected to the Y side, while the logic state of the UD terminal is 1, all of the programmable up-down counters 9, 10 and 11 act as up counters and begin to count up from the initial state of 32 to 33, 34 . . . by the input pulses applied to the CK terminal of the programmable up-down counter 9. When the programmable up-down counters 9, 10 and 11 count up to 500, a pulse to reset the programmable up-down counters is generated by the operation of the NAND gate 12, and by this pulse all the load terminals LD of the programmable up-down counters 9, 10 and 11 are triggered to reset the programmable up-down counters 9, 10 and 11 to the initial state 32. Then, the programmable up-down counters 9, 10 and 11 start the counting up from 32 to 33, 34 . . ., again. So in the above mentioned case the programmable up-down counters 9, 10 and 11 act as a 1/468 divider. Because these dividers are constituents of the phase lock loop, the voltage controlled oscillator 6 oscillates at a frequency of 468f for the reference frequency f. Then, the motor 1 rotates at the speed proportional to the above mentioned frequency 468f.

In this case, when the divisor control input is set to 0 (0000, 0000), the programmable up-down counters 9, 10 and 11 act as a 1/500 divider as the same manner as mentioned above, and so the motor 1 rotates at the speed proportional to the frequency 500f. When this speed is selected as the standard speed, that is the deviation is measured from this speed, the deviation of the motor speed for the former example from the standard motor speed is calculated as follows;

$$(468f - 500f/500f) \times 100 = -6.4 (\%).$$

That is, the speed of the motor is adjusted to decrease 6.4 percent from the standard motor speed.

Next the case of adjusting the motor speed to +6.4 percent deviation from the standard motor speed will be described. The divisor control input is preset to 32 again, but the switch 13 is connected to the x side. In this case, because the logic state of terminals a and c of the programmable up-down counter 11 is 1, the programmable up-down counters 11, 10 and 9 are set to 532(0101, 0011, 0010). Besides, because the logic state of the UD terminals is switched to 0, the programmable up-down counters 9, 10 and 11 act as down counters and begin to count down from the initial state of 532 to 531, 530, . . . by the input pulses applied at the CK terminal of the programmable up-down counter 9. When the count reaches 0, a reset pulse is generated from the CB terminal of the programmable up-down counter 11 so as to reset the content of the programmable up-down counters 9, 10 and 11 to 532 (0101, 0011, 0010) again. After that, the same operation is repeated. Therefore, the programmable up-down counters 9, 10 and 11 operates as a 1/532 divider. So, for the input reference frequency f, according to the characteristic of the phase lock loop, the voltage controlled oscillator 6 oscillates at the frequency of 532f. Then, the motor 1 rotates at the speed proportional to the frequency 532f. At this time, the deviation of the motor speed from the standard motor speed is calculated as follows;

$$(532f - 500f/500f) \times 100 = +6.4 (\%)$$

That is, the speed of the motor is adjusted to increase 6.4 percent from the standard motor speed.

As described above, by presetting the divisor control input to 32, the motor speed can be changed by 6.4% from the standard motor speed. So, because 6.4/32=0.2, it is possible to increase or decrease the motor speed by a step of 0.2%. Further, by modifying the manner of presetting of the programmable up-down counters and the logic for forming the instruction signal to the load terminal LD, the percentage step of the motor speed change can be freely varied over a considerable range. The following table shows an example of the relation between the variable pitch of the deviation (%) of the motor speed and the divisor for zero percent deviation.

| Divisor at 0% | $\frac{1}{100}$ | $\frac{1}{200}$ | $\frac{1}{250}$ | $\frac{1}{400}$ | $\frac{1}{500}$ | $\frac{1}{1000}$ |
| --- | --- | --- | --- | --- | --- | --- |
| Variable pitch of the speed (frequency) | 1 | 0.5 | 0.4 | 0.25 | 0.2 | 0.1 |

That is, by setting the divisor corresponding to the standard motor speed to an integer power of 10 or to 2, 4, ½ or ¼ times an integral power of 10, the deviation of the motor speed for the change of one step of that divisor can be easy expressed in percentage units.

While an asynchronous up-down counter is used in the embodiment of FIG. 1, the motor speed adjusting apparatus of the invention can be also provided in a similar configuration with the use of a synchronous up-down counter. Moreover, although the operation of such as an up counter or a down counter is switched by a usual switch, this can be replaced by a logic gate circuit.

Figure 2:
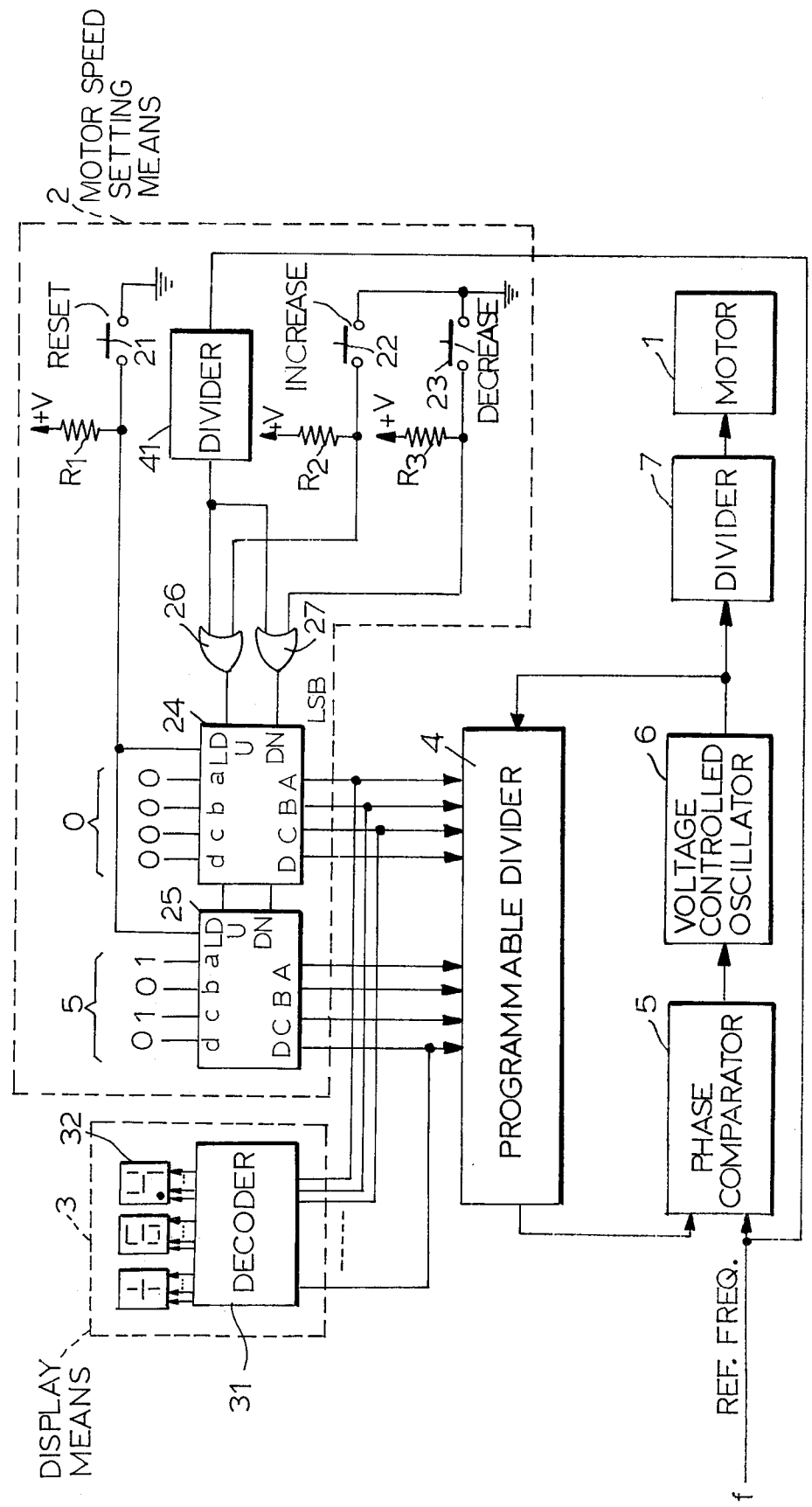
FIG. 2 is a circuit block diagram of another embodiment of the invention.

FIG. 2 shows another embodiment of the invention, in which the motor speed is adjusted by a step of 0.2% and this adjustment is displayed by means of an automatic scanner. In FIG. 2, the sections performing the same operations as those of FIG. 1 are designated by the same reference numerals. As shown in FIg. 2, programmable up-down counters 24 and 25 have a clock terminal U for up counting, a clock terminal DN for down counting, four BCD preset input terminals a, b, c and d, four BCD output terminals A, B, C and D, and load terminal LD which controls the loading of the preset value at the preset input terminals a, b, c and d into the programmable up-down counter, respectively. These 5 terminals a, b, c and d, and A, B, C and D correspond in turn to numerals $2^0$, $2^1$, $2^2$ and $2^3$, respectively. It is arranged that the preset value is loaded when the logic level of the LD terminal is 0.

The display means 3 contains a decoder 31 for providing the correspondence between the value at the terminals A, B, C and D and the deviation of the motor speed and a display element 32, which is composed of eg. light emitting diodes or Nixy tubes, for displaying the deviation of the motor speed (in percent in the above embodiment). A divider 41 generates a clock pulse for increasing or decreasing the content of the programmable up-down counters 24 and 25 with the reference frequency signal used as the input thereto. OR gates 26 and 27 select an up counting operation or a down counting operation. The output terminal of OR gate 26 is connected to the U terminals of the programmable up-down counters 24 and 25. The output terminal of OR gate 27 is connected to the DN terminals of the programmable up-down counters 24 and 25. A reset switch 21 is connected to the LD terminals of the programmable up-down counters 24 and 25. One of two input terminals of the OR gate 26 is connected to the output terminal of the divider 41 for generating the clock pulse, and the other is connected to an increase switch 2 for increasing the speed of the motor 1. Similarly, one of two input terminals of the other OR gate 27 is connected to the output terminal of the divider 41, and the other is connected to a decrease switch 23 for decreasing the speed of the motor 1. Further, there are provided pull up resistors $R_1$, $R_2$, and $R_3$ for providing the logic level of 1 to the respective logic circuits described above.

As described hereinbefore, the frequency divider 7 is connected between the voltage controlled oscillator 6 and the motor 1 in order to decrease the output frequency of the phase lock loop to a frequency suitable for controlling the speed of the frequency controlled motor. In this embodiment, the divisor of the diviser 7 is set to 1/500. The divisor of programmable divider 4 is changed by the instruction signal from the programmable up-down counters 24 and 25. This is arranged so as to act as a 1/450 divider when the instruction output of the programmable up-down counters 24 and 25 is 0 (0000, 0000) and act as a 1/(450+n) divider when the instruction output is n (n is an integer larger than 1). Besides, the programmable up-down counters 25 and 24 are preset to 50 (0101, 0000).

Now the operation of adjusting the motor speed in this embodiment will be described. At first, reset switch 21 is pushed to set the initial state. Then, the value of 50 (0101, 0000) is read in the programmable up-down counters 25 and 24, and consequently the programmable divider 4 becomes a (1/450+50)=1/500 divider. Then, when the reference frequency applied to the phase comparator 7 is f, the voltage controlled oscillator 6 oscillates at a frequency of 500f. This oscillation frequency is divided by 500 in the divider 7, and the frequency controlled motor 1 is rotated at the frequency f. At this time, the outputs A, B, C and D of the programmable up-down counters 24 and 25 are processed by the decoder 31 so that the deviation of the motor speed is displayed as 0.0% by the display element 32.

Next, will be described the case of setting the deviation of the motor speed from +6.4% to the standard motor speed. At first, the increase switch 22 is pushed so as to open the gate of the OR gate 26. Then, the clock pulses generated from the divider 41 are applied to the U terminal of the programmable up-down countes 24 and 25 and the content of the programmable up-down counters 24 and 25 increases as from 50 to 51, 52, . . . When the increase switch 22 is released after the divider 41 has generated 32 pulses, the gate of the OR gate 26 is closed, and so the content of the up-down counters 25 and 24 is fixed at 82. Therefore, the programmable divider 4 becomes a (1/450+82)=1/532 divider, and the voltage controlled oscillator 6 oscillates at the frequency of 532f. This oscillation frequency is divided by the divider 7 as 532f/500=1.064f and the motor 1 is rotated according to that frequency. At this time, by means of the decoder 31 and the display element 32, the deviation of the motor speed is displayed as +6.4%.

In order to return the motor speed from this state to the standard motor speed of 0.0% deviation, the decreases switch 23 is pushed so as to provide the clock pulses to the clock terminal DN for down counting, and it is released after counting down 32 pulses. Then, the motor speed is adjusted to 0.0% deviation, again. It takes a long time to adjust the frequency in this manner, and further it is necessary to always watch the display. In order to prevent these problems, in this embodiment, the reset switch 21 is pushed instead of the above operation. Then, the input terminals of the programmable up-down counters 25 and 24 are again preset to 50 (0101, 0000), and so the motor speed can be instantly adjusted to 0.0% deviation, the standard motor speed. When the reference frequency signal is provided by dividing the output of a reference signal oscillator such as a crystal oscillator having an oscillation frequency higher than the reference frequency f, it is possible to suitably divide the output of that reference oscillator and use it as the clock pulse.

Figure 3:
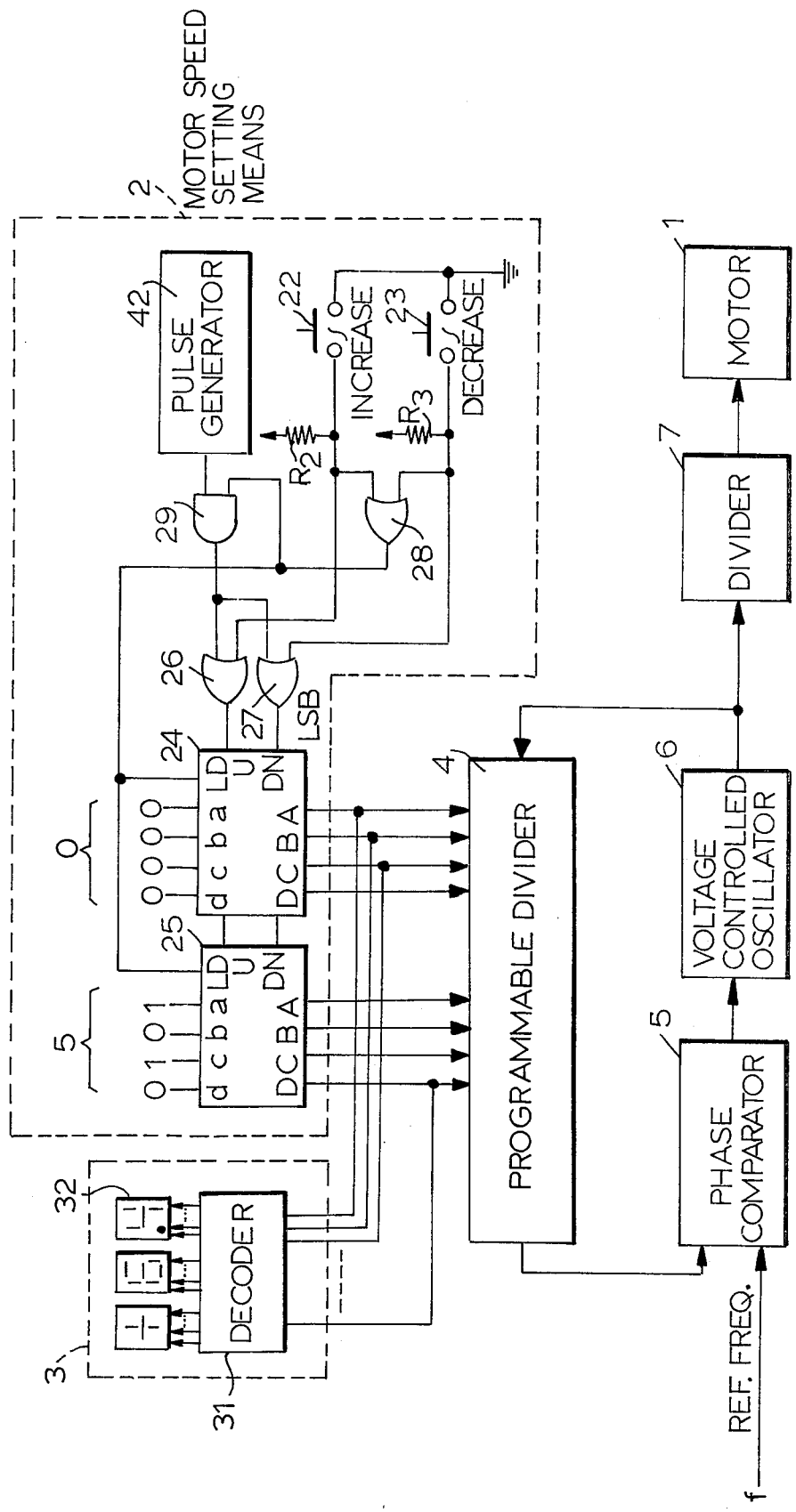
FIG. 3 is a circuit block diagram of a further embodiment of the invention, in which the motor speed setting means in FIG. 2 is embodied in a different manner.

FIG. 3 shows another embodiment of the motor speed setting means 2, in which the reset switch 21 in FIG. 2 for setting the motor speed to the standard speed is omitted, and instead it is arranged that pushing of the increase switch 22 and the decrease switch 23 at the same time provides the reset operation for setting the motor speed to the standard speed. This configuration is similar to that of FIG. 2, except that there are provided OR gate 28, AND gate 29 and clock pulse generator 42 formed by eg. a RC oscillator or an astable multivibrator. In FIG. 3, when the increase switch 22 and the decrease switch 23 are pushed at the same time, the two inputs to the OR gate 28 both become logic 0, and consequently the output thereof also becomes logic 0. The the output of the OR gate 28 is connected to the load terminals LD of the programmable up-down counters 24 and 25, the preset value 50 (0101, 0000) is loaded. On the other hand, because the output of the pulse generator 42 is inhibited by the AND gate 29, the clock pulse is not counted, and so the motor speed is adjusted to the standard 0.0% deviation.

Although in the embodiments described hereinbefore, the programmable up-down counter has a clock input terminal for counting up and a clock input terminal for down counting down, it is also possible to use an up-down counter having only one input clock and instead having a terminal for changing the operation of up and down counting. Further, although the above embodiments are described using a BCD programmable counter, the invention is not limited thereto, and of course a similar apparatus can be provided with use of combination of general ½ dividers. Further, by changing the basic divisor of the programmable divider 4, the pitch of the deviation of the motor speed is not limited to 0.2% and any pitch can be possible. Also, the divider 7 is not limited to a 1/500 divider, and any suitable divisor for controlling the motor speed can be used.

As described hereinbefore, according to the motor speed adjusting apparatus of the invention, the motor speed can be adjusted by a suitable percentage deviation. Moreover, by operating a reset switch or operating the increase switch and the decrease switch at the same time, the motor speed can be instantly adjusted to the standard motor speed from any set deviation state without progressing through other deviations. According to these advantageous features of the invention, the apparatus can be used especially effectively in a record player or a tape recorder.

What is claimed is:

1. A motor speed adjusting apparatus comprising:
a motor speed setting means for generating a motor speed setting signal;
a programmable divider connected to said motor speed setting means, having an input and an output, for generating a division signal having a frequency which is the frequency of the signal applied to said input divided by an integral divisor, said divisor corresonding to said motor speed setting signal;
a reference signal generating means for generating a reference signal having a constant frequency;
a phase comparator connected to said programmable divider and said reference signal generating means for generating a d.c. signal corresponding to the phase difference between said division signal and said reference signal;
a voltage controlled oscillator connected to said phase comparator for generating an output signal having a frequency corresponding to said d.c. signal of said phase comparator, said output signal being applied to said input of said programmable divider and said output signal for application to a frequency controlled motor for control of the speed of the frequency controlled motor by the frequency thereof; and
a display means connected to said motor speed setting means for displaying an indication of said motor speed setting signal, whereby said divisor of said programmable divider is stepwise changeable by said motor speed setting signal from a standard number N (N being an integer) which corresponds to a nominal motor speed and said display means displays the rate of deviation of said divisor from said standard number N.

2. A motor speed adjusting apparatus according to claim 1, wherein said motor speed setting means comprises:
a clock pulse means for generating a series of clock pulses;
an up-down counter connected to said clock pulse means, the count of said up-down counter being said motor speed setting signal; and
a switching means connected to said up-down counter for selectively controlling said up-down counter to increase said count at the rate of said clock pulses, to decrease said count of the rate of said clock pulses or to reset said count to a standard value for causing said divisor of said programmable divider to be said standard number N.

3. A motor speed adjusting apparatus according to claim 2, wherein said clock pulse means includes said reference frequency signal generator.

4. A motor speed adjusting apparatus according to claim 10, wherein said apparatus further comprises a divider connected between said voltage controlled oscillator and said frequency controlled motor for generating an output signal having a frequency which is a predetermined division of the frequency of said output signal of said voltage controlled oscillator.

5. A motor speed adjusting apparatus according to claim 1, wherein said display means displays the deviation of the motor speed from said standard motor speed in units of percent.

6. A motor speed adjusting apparatus according to claim 5, wherein said standard number N is selectably settable as N=n,2n, 2.5n, 4n or 5n (where n=10, 100, 1000, 10000, . . .) whereby the motor speed of said frequency controlled motor can be adjusted by steps of 100/n, 50/n, 40/n, 25/n or 20/n percent, respectively.

7. A motor speed adjusting apparatus according to claim 6, wherein the number of n is set as n=1000, whereby the speed of said frequency controlled motor can be adjusted by steps of 0.1, 0.05, 0.04, 0.025, or 0.02 percent.

8. A motor speed adjusting apparatus according to claim 2, wherein said switching means comprises: an increasing switch for setting said up-down counter in an up counting state; a decreasing switch for setting said up-down counter in a down counting state; and a reset switch for resetting said up-down counter to said standard value for causing said divisor to be N.

9. A motor speed adjusting apparatus according to claim 2, wherein said switching means comprises: an increasing switch for setting said up-down counter in an up counting state; a decreasing switch for setting said up-down counter in down counting state; and reset means for resetting said up-down counter to said standard value for causing said divisor to be N only when both said increasing and decreasing switches are actuated at the same time.

* * * * *